Patented Nov. 28, 1950

2,531,999

UNITED STATES PATENT OFFICE 2,531,999

MANUFACTURE OF CRYSTALLINE DEXTROSE

Leo Wallerstein, New York, N. Y., assignor to Wallerstein Company, Inc., New York, N. Y., a corporation of New York No Drawing. Application October 13, 1947, Serial No. 779,635

8 Claims. (Cl. 195—11)

This invention relates to the manufacture of crystalline dextrose.

The present industrial manufacture of crystalline dextrose is essentially based on the conversion of starch to dextrose by means of acid, usually hydrochloric acid, as the hydrolytic agent. In this manufacturing process, economic as well as technical requirements result in the formation of a considerable amount of by-products of little value. Also, the resulting crystallization and separation of crystals involves great difficulty.

One of the chief disadvantages of the acid conversion process is the formation of substantial amounts of reversion products. Extremely large seedings are necessitated, and considerable tie-up in equipment and material is involved during the long, slow crystallization process. Very careful temperature control is also an important requirement. Special processes for recycling and reconversion of the mother liquors for efficient yields, and the production of large amounts of hydrol are further obvious disadvantages in the present art.

It is the object of this invention to effect the hydrolysis of starch under such conditions that crystallization is markedly facilitated, the production of undesirable by-products of little value minimized, and increased yields of dextrose are obtained. To accomplish this object, hydrolysis of starch and its partial conversion products is effected by suitable enzyme action under proper conditions, in which any preliminary breakdown of starch is limited in such a way as to minimize formation of reversion products capable of interfering with the crystallization, and the final hydrolysis with enzymes is conducted in such a way as to obtain a completeness of hydrolysis and a purity of hydrolysate, with respect to dextrose, not possible with known methods. It is a further consequence of the method of this invention that a highly flexible procedure is provided capable of being used effectively and economically with any type of starch or starchy materials or partial conversion products thereof, and regardless of the preliminary treatment which the material may receive, provided only that any preliminary conversion, as with acid, be not carried so far as to produce reversion products in an amount and of the type which interfere with the crystallization process in the final hydrolysate.

In the method of the invention, an aqueous dispersion of starch or a starch conversion product is subjected to the action of a microbiological enzyme having starch-glucogenase activity to produce substantially complete conversion to dextrose, the product is maintained at crystallizing temperature, advantageously in the presence of dextrose crystals, until a substantial proportion of discrete dextrose crystals have formed, and the dextrose crystals are separated from the mother liquor.

The method of the invention may be applied to a wide variety of starches, starchy materials, and converted starches. As more particularly described in a copending application, by the utilization of other enzymes in combination with the starch-glucogenase enzyme boiling or gelatinizing of the starch may be eliminated and the raw ungelatinized starch in its native state may be effectively converted into dextrose. It also has been found that the mother liquors from which the dextrose crystals have been separated may be reused for the hydrolysis of further amounts of starch or starch conversion products as is more particularly described in another copending application.

Also, the enzyme process of the invention may be used to prepare hydrolysates of the requisite dextrose purity for rapid crystallization by the simple, convenient process of allowing the enzyme to act on conventional acid-converted sirups, provided only that the acid conversion has been effected under conditions as to acid concentrations, autoclaving pressures, and time periods in such a way as to minimize formation of reversion products of the type which interfere with crystallization.

By such methods, it has been found possible to obtain a high degree of purity of the final hydrolysates, such that dextrose content may be 75% or over, on the dry basis, whereby, together with the absence of or reduction in certain reversion products, the production and separation of discrete crystals of dextrose is markedly facilitated. When seed crystals are used to facilitate crystallization, only relatively small amounts of seed crystals are needed, in contrast to the large proportions of seed crystals required in the presently used processes for making dextrose.

The starch-glucogenase enzymes useful in the invention may be obtained from various fungal sources, particularly the species of Aspergillus, such as *Aspergillus oryzae* and from certain bacterial species, for example, *Clostridium acetobutylicum*.

The starch-glucogenase activity of the enzyme preparations may be expressed conveniently in terms of the unimolecular reaction constant "$k$" which represents the initial reaction velocity of the formation of dextrose. When tested under prescribed conditions, it has been found that the course of the formation of dextrose from Lintner starch as a result of the starch-glucogenase activity of the enzyme preparation follows the unimolecular reaction law as expressed by the equation $$k=\frac{1}{t}\log 10\frac{a}{a-x}$$

wherein $k$ is the unimolecular reaction constant, $t$ is the time, $a$ is the initial and $a-x$ is the concentration of the starch at time "$t$."

For starch-glucogenase activity, the value of $k$ has been found to be substantially proportional to enzyme activity when tested under conditions such that about 50% hydrolysis is effected on a 1% Lintner starch solution at a pH value of 5.0 and a temperature of 40° C. in 30 minutes. For the determination, 5 ml. of a "test" solution of the enzyme preparation is added to a solution containing 25 ml. of water and 10 ml. of a 1% Lintner starch solution buffered at pH 5.0 and the hydrolysis is allowed to proceed for exactly 30 minutes at 40° C. 2 ml. of a 5% sodium carbonate solution is then added to stop hydrolysis and the volume is made up to 50 ml. with water. The quantity of dextrose formed by the action of the enzyme on the starch is determined colorimetrically by the Tauber and Kleiner method as modified by Gray and Rothchild, Ind. & Eng. Chem. Anal. Ed. 13:902 (1941). The value of $k$ for the enzyme "test" solution is defined as calculated from the data thus obtained by the equation $$k \text{ (of ``test'' solution)}=\frac{1}{30}\log\frac{100}{100-x}$$

wherein $x$ is the percent hydrolysis calculated from the amount of dextrose formed. A "$k$" value, based on 100 grams of the enzyme preparation, is calculated by the equation "$k$" (per 100 gm. enzyme preparation)=
$$\frac{k \text{ (of ``test'' solution)}\times 100}{\text{concentration of enzyme preparation in ``test'' solution (in grams per 100 ml.)}}$$

The "$k$" value as thus determined and calculated will be used in the specification and claims to designate the starch-glucogenase activity of an enzyme preparation.

In general, to obtain starch hydrolysates which readily form discrete crystals of dextrose it is desirable to use an enzyme preparation having a starch-glucogenase activity sufficient to effect substantially complete hydrolysis of the starch substrate in not more than 72 hours when not more than 1% of the enzyme preparation, based on the weight of the starch, is employed. Such an enzyme will have a "$k$" value of the order of 1.0. Enzyme preparations having a "$k$" value as high as 10 or even higher may be employed, the amount of the enzyme preparation used being decreased in proportion to the increasing "$k$" value. In general, the amount of the enzyme preparation used should be at least about 1/"$k$" parts by weight for each 100 parts by weight of starch or starch conversion product and preferably about two to three times this proportion of enzyme is used.

The method of the invention makes possible the production of full yields of crystalline dextrose from starches and starch-containing materials of practically any type, purity or preliminary treatment. The method can be applied successfully to corn starch, corn meal, wheat flour, wheat starch, tapioca starch, waxy maize starch, potatoes, sweet potatoes, sorghum, and rice. It may be applied to starch products thinned and partially dextrinized by preliminary heating with dilute acid, or which have been liquefied with the aid of amylolytic enzymes, or which have been simply gelatinized, as by heating with water, without special thinning treatment.

It is also a particular advantage of the invention that excellent results are obtained with relatively high starch or starch conversion product concentrations, for example, as high as 65%, whereby liquors may be produced containing a sufficiently high concentration of dextrose to crystallize without evaporation or other concentrating.

The following specific examples are illustrative of the principles of the invention:

Example 1

A suspension of 50% by weight of corn starch in N/20 HCl is heated in an autoclave for one-half hour at 20 pounds pressure. The liquefied starch is then cooled and the pH adjusted to 5.0 with alkali. The dextrose equivalent content (dry basis) at this stage is about 25% and the dextrose content (dry basis) is about 9%. 0.5% (on the weight of the starch) of a fungal enzyme having a starch-glucogenase "$k$" value of approximately 10 is then added and the mixture is kept at 45° C. for 48 hours. The dextrose equivalent content (dry basis) is now about 92% and the dextrose content (dry basis) about 90%.

About 0.1% of activated carbon is added and the mixture is filtered and evaporated to about 65% to 70% solids. A small amount of seed crystals of dextrose hydrate, for example, 0.1%, are added and the mass is held at about 20° C. to crystallize. The crystals are separated from the mother liquor by centrifuging or filtering, washed and dried. The concentration of the liquor before crystallization may vary from 60% to 80% solids depending on the available equipment and the type and speed of crystallization desired. The temperature of the crystallization will be higher with increasing concentration of the liquor. For the preparation of anhydrous dextrose still higher temperatures are employed, the relative temperature ranges suitable for dextrose hydrate and anhydrous dextrose crystallization being well known in the art.

Example 2

To a suspension of potato starch (1 part by weight of starch and 4 parts of water) is added 2% (on the weight of the starch) of ground high diastatic malt. The pH is adjusted to about 5.5 and the temperature is raised slowly with stirring to 70° C. After 10 minutes at 70° C., the temperature is raised to 75° C. in 5 minutes and held for 5 minutes, then raised to 80° C. in 10 minutes and held for 5 minutes, raised to 85° C. in 10 minutes and held for 5 minutes, and then raised to the boiling point and boiled for 20 minutes. The batch is then cooled and the pH adjusted to 5.0. 0.4% (on the weight of the starch) of a fungal enzyme of starch-glucogenase "$k$" value about 5 is added and the mixture is held at 45° C. for 48 hours, toluene being added as a preservative. The resulting product is filtered, and the filtrate evaporated to 50% solids, and treated with activated carbon. The liquor is again filtered, evaporated to 80% to 85% solids, seeded with about 0.1% of anhydrous dextrose crystals and held at about 45° C. with slow stirring until crystallized. The crystals are separated, washed, and dried.

Example 3

A suspension of 1 part by weight of corn starch in 4 parts of water is prepared, the pH is brought up to 6.5 with Ca(OH)$_2$ and about 1% of a bacterial amylase is added. The temperature is brought up to 70° C. with stirring in about one-half hour and held for 10 minutes, then raised to 75° C. in 10 minutes and held for 5 minutes, raised to 80° C. in 10 minutes and held 5 minutes, raised to 85° C. in 10 minutes and held 10 minutes, and finally brought to boiling and boiled for 20 minutes. After cooling, sodium sulfite equivalent to about 100 parts per million of SO$_2$ is added, the pH is adjusted to 5.0, and 0.6% (on the weight of the starch) of a fungal enzyme of starch glucogenase "$k$" value 8.5 is added. The mixture is kept at 45° C. for 24 to 48 hours and filtered. The filtrate has a dextrose equivalent content (dry basis) of 98% and a dextrose content (dry basis) of 95%.

The filtrate is evaporated to about 50% solids, treated with about 0.1% of activated carbon, filtered, evaporated to about 75% to 80% solids, seeded with about 0.1% dextrose hydrate crystals and crystallized at about 37° C. The crystals are separated, washed, and dried.

Example 4

A suspension of 1 part by weight of corn starch in 19 parts of water is brought to a boil and boiled for 10 minutes. The solution is cooled, sodium sulfite equivalent to 100 parts per million of SO$_2$ is added and the pH is adjusted to 5.0. 0.2% (on the weight of the starch) of a fungal enzyme of starch-glucogenase "$k$" value of 10 is added and the mixture is kept at 45° C. for 48 hours. The dextrose equivalent content and the dextrose content (dry basis) at this stage are about 97%. The liquor is filtered and evaporated to 65% to 70% solids, about 0.1% of dextrose hydrate crystals are added, and the liquor is crystallized at room temperature. The crystals are separated from the mother liquor, washed, and dried.

If a thin boiling starch, such as thin boiling starch No. 140, is used in the procedure of Example 4, the starch suspension may be much more concentrated, for example, one part by weight of starch to four parts of water.

Other starches and starch-containing substances may be substituted for the corn starch in the foregoing examples.

Example 5

An aqueous solution of commercial corn sirup (about 42% dextrose equivalent, dry basis) is prepared, containing about 40% solids and adjusted to pH 5.0. One-half percent (on the weight of sirup solids) of a fungal enzyme having a starch glucogenase "$k$" value of approximately 4 is then added and the mixture is kept at 45° C. for 48 hours. The dextrose equivalent content (dry basis) is now about 87%. The dextrose content (dry basis) is 84%.

Some filter aid and about 0.1% of activated carbon is added and the liquor is then filtered. The filtrate is concentrated by evaporation. The procedure for crystallization is similar to that given in Example 1.

Since most of the processes used for hydrolysis, especially when acids are employed, result in the formation of secondary reaction products tending to interfere with crystallization as the extent of the preliminary hydrolysis increases, I have generally found it desirable that any conversion of the starch effected prior to the action of the starch-glucogenase enzyme should not exceed a dextrose equivalent content (dry basis) of about 65% and preferably should be not more than about 55%. The action of the starch-glucogenase enzyme should in general be carried to a dextrose content (dry basis) of at least 75%.

Particularly satisfactory crystallization of the dextrose is obtained when the preliminary hydrolysis of the starch substance is limited to a dextrose equivalent content (dry basis) of not over about 30% and the action of the starch-glucogenase enzyme is carried to a dextrose equivalent content (dry basis) or over 90% and a dextrose content (dry basis) of at least about 85%.

The mother liquors from the crystallization and separation of the dextrose crystals produced by the method of the invention represent products suitable for food or other valuable use and hence may be either evaporated and sold as sirups or, if desired, they may be returned to any step in the process for further processing, preferably prior to the treatment with enzyme.

I claim:

1. A method of making crystalline dextrose which comprises subjecting an aqueous dispersion of a substance of the group consisting of starches and conversion products thereof to the action of a microbiological enzyme preparation having starch-glucogenase activity equivalent to an initial reaction value "$k$" of at least 1.0 to convert a substantial proportion of the substance to dextrose, maintaining the product thus obtained at crystallizing temperature until a substantial proportion of discrete dextrose crystals have formed, and separating the dextrose crystals from the mother liquor.

2. A method of making crystalline dextrose which comprises subjecting an aqueous dispersion of a substance of the group consisting of starches and conversion products thereof to the action of a microbiological enzyme preparation having starch-glucogenase activity equivalent to an initial reaction value "$k$" of at least 1.0 to convert a substantial proportion of the substance to dextrose, maintaining the product thus obtained at crystallizing temperature at a concentration of from about 60% to about 80% solids until a substantial proportion of discrete dextrose crystals have formed, and separating the dextrose crystals from the mother liquor.

3. A method of making crystalline dextrose which comprises subjecting an aqueous dispersion of a substance of the group consisting of starches and conversion products thereof to the action of a microbiological enzyme preparation having starch-glucogenase activity equivalent to an initial reaction value "$k$" of at least 1.0 to convert a substantial proportion of the substance to dextrose, maintaining the product thus obtained at crystallizing temperature in the presence of dextrose crystals at a concentration of from about 60% to about 80% solids until a substantial proportion of discrete dextrose crystals have formed, and separating the dextrose crystals from the mother liquor.

4. A method of making crystalline dextrose which comprises subjecting an aqueous dispersion of a substance of the group consisting of starches and conversion products thereof having a dextrose equivalent content (dry basis) not exceeding 65% to the action of a microbiological enzyme preparation having starch-glucogenase activity equivalent to an initial reaction value "$k$" of at least 1.0 to produce a product having a dextrose content (dry basis) of at least 75%, maintaining the product thus obtained at crystallizing temperature at a concentration of from about 60% to about 80% solids until a substantial proportion of discrete dextrose crystals have formed, and separating the dextrose crystals from the mother liquor.

5. A method of making crystalline dextrose which comprises subjecting an aqueous dispersion of a substance of the group consisting of starches and conversion products thereof having a dextrose equivalent content (dry basis) not exceeding 30% to the action of a microbiological enzyme preparation having starch-glucogenase activity equivalent to an initial reaction value "$k$" of at least 1.0 to produce a product having a dextrose equivalent content (dry basis) of at least 90%, maintaining the product thus obtained at crystallizing temperature at a concentration of from about 60% to about 80% solids until a substantial proportion of discrete dextrose crystals have formed, and separating the dextrose crystals from the mother liquor.

6. In the production of substantially pure crystalline dextrose by the enzymatic hydrolysis of substances of the group consisting of starch and starch conversion products, the steps which comprise subjecting an aqueous dispersion of such substance to the action of a microbiological enzyme preparation having starch-glucogenase activity equivalent to an initial reaction value "$k$" of at least 1.0 to convert a substantial portion of the substance to dextrose, maintaining the hydrolyzed product under crystallizing conditions until a substantial proportion of discrete dextrose crystals have formed and separating the dextrose crystals from the mother liquor.

7. In the production of substantially pure crystalline dextrose by the enzymatic hydrolysis of substances of the group consisting of starch and starch conversion products, the steps which comprise subjecting an aqueous dispersion of such substance to the action of a microbiological enzyme preparation having starch-glucogenase activity equivalent to an initial reaction value "$k$" of at least 1.0 to convert a substantial portion of the substance to dextrose, maintaining the hydrolyzed product at crystallizing temperature at a concentration of from about 60% to about 80% solids until a substantial proportion of discrete dextrose crystals have formed and separating the dextrose crystals from the mother liquor.

8. In the production of substantially pure crystalline dextrose by the enzymatic hydrolysis of substances of the group consisting of starch and starch conversion products, the steps which comprise subjecting an aqueous dispersion of such substance to the action of a microbiological enzyme preparation having starch-glucogenase activity equivalent to an initial reaction value "$k$" of at least 1.0 to convert a substantial portion of the substance to dextrose, maintaining the hydrolyzed product under crystlalizing conditions in the presence of dextrose crystals until a substantial proportion of discrete dextrose crystals have formed and separating the dextrose crystals from the mother liquor.

LEO WALLERSTEIN.

REFERENCES CITED

The following references are of record in the file of this patent:

UNITED STATES PATENTS

| Number | Name | Date |
|---|---|---|
| 2,188,193 | Schooler | Jan. 23, 1940 |
| 2,201,609 | Dale et al. | May 21, 1940 |
| 2,302,310 | Glarum et al. | Nov. 17, 1942 |
| 2,305,168 | Langlois | Dec. 15, 1942 |